(12) United States Patent
Blanchard et al.

(10) Patent No.: US 11,299,989 B2
(45) Date of Patent: Apr. 12, 2022

(54) ASSEMBLY FOR A TURBINE OF A TURBOMACHINE COMPRISING A MOBILE SEALING RING

(71) Applicant: Safran Aircraft Engines, Paris (FR)

(72) Inventors: Stéphane Pierre Guillaume Blanchard, Moissy-Cramayel (FR); Nicolas Xavier Trappier, Moissy-Cramayel (FR); Quentin De Richaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/965,845

(22) PCT Filed: Jan. 29, 2019

(86) PCT No.: PCT/FR2019/050203
§ 371 (c)(1),
(2) Date: Jul. 29, 2020

(87) PCT Pub. No.: WO2019/150042
PCT Pub. Date: Aug. 8, 2019

(65) Prior Publication Data
US 2021/0054743 A1  Feb. 25, 2021

(30) Foreign Application Priority Data

Jan. 30, 2018 (FR) ...................................... 1850737

(51) Int. Cl.
*F01D 5/08* (2006.01)
*F01D 5/06* (2006.01)
(Continued)

(52) U.S. Cl.
CPC ............... *F01D 5/066* (2013.01); *F01D 5/08* (2013.01); *F01D 11/005* (2013.01); *F02C 7/18* (2013.01);
(Continued)

(58) Field of Classification Search
CPC .......... F01D 5/066; F01D 11/005; F01D 5/08; F02C 7/18; F05D 2220/32; F05D 2230/60; F05D 2240/24; F05D 2240/55
See application file for complete search history.

(56) References Cited

U.S. PATENT DOCUMENTS 4,097,194 A * 6/1978 Barack ................... F01D 5/021
416/244 A
4,526,508 A * 7/1985 Antonellis ............ F01D 11/001
415/173.7
(Continued)

FOREIGN PATENT DOCUMENTS

EP   0921273 A1   6/1999
EP   1571294 A1 * 9/2005 ............... F01D 5/08
(Continued)

OTHER PUBLICATIONS

International Search Report dated Apr. 17, 2019 in International Application No. PCT/FR2019/050203.
(Continued)

*Primary Examiner* — J. Todd Newton
*Assistant Examiner* — Theodore C Ribadeneyra
(74) *Attorney, Agent, or Firm* — Sughrue Mion, PLLC

(57) ABSTRACT

The invention relates to an assembly (1) for a turbine of a turbomachine, comprising: a first rotor disk (20a), a second rotor disk (20b), a part forming a mobile ring (28), comprising a system for preventing rotation of the mobile ring (28) relative to the rotor disks (20a, 20b), said system comprising: a rotor disk securing flange (222) having a (Continued)

plurality of teeth (224) that are distributed circumferentially about the turbomachine longitudinal axis (X-X), and a mobile ring securing flange (282) having a plurality of lugs (284) that are distributed circumferentially about the turbomachine longitudinal axis (X-X), the engagement of the rotor disk securing flange (222) with the mobile ring securing flange (282) ensuring, by means of the teeth (224) and the lugs (284), that the mobile ring (28) does not rotate relative to the rotor disks (20a, 20b).

10 Claims, 9 Drawing Sheets

(51) Int. Cl.
*F01D 11/00* (2006.01)
*F02C 7/18* (2006.01)

(52) U.S. Cl.
CPC ...... *F05D 2220/32* (2013.01); *F05D 2230/60* (2013.01); *F05D 2240/24* (2013.01); *F05D 2240/55* (2013.01); *F05D 2260/20* (2013.01)

(56) References Cited

U.S. PATENT DOCUMENTS

| | | | | |
|---|---|---|---|---|
| 4,730,982 A * | 3/1988 | Kervistin | ................ | F01D 5/084 416/95 |
| 5,232,339 A * | 8/1993 | Plemmons | .............. | F01D 5/084 415/177 |
| 5,350,278 A * | 9/1994 | Burge | ..................... | F01D 5/066 416/198 A |
| 5,472,313 A * | 12/1995 | Quinones | ............... | F01D 5/082 415/115 |
| 6,361,277 B1 * | 3/2002 | Bulman | ................ | F04D 29/582 416/96 R |
| 8,215,919 B2 * | 7/2012 | Jewess | .................... | F01D 5/023 416/244 R |
| 8,382,432 B2 * | 2/2013 | Grissino | .................. | F16J 15/44 416/95 |
| 9,188,008 B2 * | 11/2015 | Coutandin | ............. | F01D 5/081 |
| 9,371,742 B2 * | 6/2016 | Belmonte | ............ | F01D 11/005 |
| 10,934,863 B2 * | 3/2021 | Morrison | .................. | F01D 5/30 |
| 2002/0187046 A1 * | 12/2002 | Beutin | .................... | F01D 5/081 416/223 B |
| 2009/0004006 A1 * | 1/2009 | Dejaune | .................. | F01D 5/081 416/95 |
| 2011/0027103 A1 * | 2/2011 | Philippot | .............. | F01D 11/006 416/97 R |
| 2015/0046126 A1 * | 2/2015 | Kepler | ...................... | F01D 5/06 702/189 |
| 2015/0240644 A1 * | 8/2015 | Ross | ........................ | F01D 5/06 415/177 |
| 2017/0051631 A1 * | 2/2017 | Ackermann | .......... | F01D 11/001 |
| 2018/0058219 A1 * | 3/2018 | Kampka | ............... | F01D 5/3053 |

FOREIGN PATENT DOCUMENTS

| | | | | |
|---|---|---|---|---|
| EP | 1921255 A2 * | 5/2008 | ............. | F01D 5/08 |
| FR | 2995036 A1 | 3/2014 | | |
| FR | 3019584 A1 * | 10/2015 | ........... | F01D 11/001 |
| FR | 3019584 A1 | 10/2015 | | |
| WO | 2005/052321 A1 | 6/2005 | | |

OTHER PUBLICATIONS

French Search Report dated Nov. 13, 2018 in French Application No. FR 1850737.

* cited by examiner

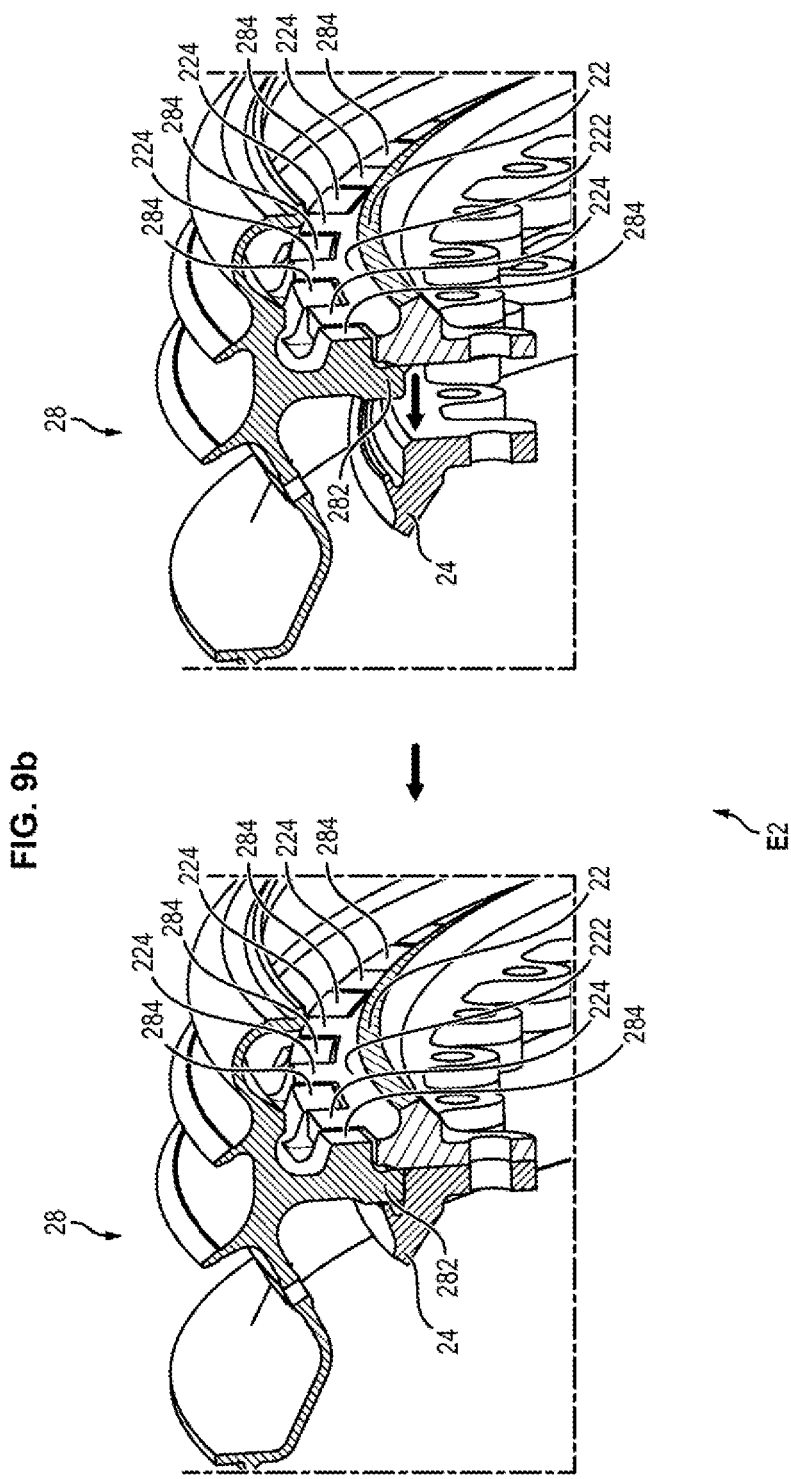

ASSEMBLY FOR A TURBINE OF A TURBOMACHINE COMPRISING A MOBILE SEALING RING

CROSS REFERENCE TO RELATED APPLICATIONS

This application is a National Stage of International Application No. PCT/FR2019/050203 filed Jan. 29, 2019, claiming priority based on French Patent Application No. 1850737 filed Jan. 30, 2018, the entire contents of each of which being incorporated by reference herein in their entireties.

FIELD OF THE INVENTION

The invention relates to an assembly for a turbine of a turbomachine.

The invention aims more specifically at an assembly for a turbine of a turbomachine comprising a part forming a movable sealing ring.

STATE OF THE ART

Document FR 2 953 250 discloses an assembly for a turbine of a turbomachine comprising a part forming a movable sealing ring.

Referring to FIG. 1, the turbine 10 consists of a distributor formed of a plurality of fixed vanes 12 disposed in a flow path 14, and a movable wheel placed behind the distributor and formed of a plurality of movable vanes 16 also disposed in the flow path 14 and mounted by their root in cells 18 of rotor discs 20a, 20b.

The rotor discs of the turbine 20a, 20b are centered on a longitudinal axis X-X of the turbomachine, and are generally assembled together by means of an upstream shroud 22 of a downstream disc 20b, and a downstream shroud 24 of an upstream disc 20a which are fastened together by a bolted connection 26 passing through fastening flanges 221 and 241. This assembly of discs 20a, 20b is in turn connected to a turbine shaft (not shown) in order to be driven in rotation.

In addition, a movable ring 28 carrying radial wipers 32 is disposed at the junction between the successive rotor discs 20a, 20b, opposite the corresponding fixed vane 12.

The movable ring 28 is fastened to the bolted connection 26 and comprises a downstream holding flange 30 bearing against the cell 18 of the rotor disc 20b downstream of said movable ring 28.

The movable ring 28 can also comprise an upstream flange 31 ensuring holding a retaining ring 27 in abutment against the disc 20a upstream of the movable ring 28.

The radial wipers 32 of the movable ring 28 cooperate with the inner annular surface of the fixed vane 12 opposite said ring 28, and thus ensure the sealing between a successive upstream cavity and downstream cavity of the flow path 14 of the turbine.

However, the outer annular portion of the movable ring 28 is subjected to very high temperatures due to the circulation of hot air within the flow path 14. This results in a strong thermal gradient between the outer annular portion of the ring 28 and its inner annular portion. This gradient causes high stresses at the fastening flanges 221 and 241. This phenomenon is more particularly illustrated in FIG. 2 which constitutes an enlargement of the outer annular portion of the bolted connection 26 between:

the fastening flange 241 of the downstream shroud 24 of an upstream disc 20a, the fastening flange 221 of the upstream shroud 22 of a downstream disc 20b, and the fastening flange 442 of the movable ring 28 disposed between the upstream disc 20a and the downstream disc 20b.

In FIG. 2, the vertical arrow illustrates the orientation and the direction of the mechanical stresses resulting from the thermal gradient in the movable ring 28 which is deformed. This results in a creeping of said movable ring 28.

Furthermore, the bolted connection 26 is subjected to centrifugal forces related to the rotation of the rotor discs 20a, 20b. These forces act on the screw crown of the bolted connection 26 which tends to extend radially so as to increase its radius which results in a deformation of the flanges which can cause leaks.

The combined action of the thermal gradient and centrifugal forces can therefore lead to the phenomenon known as "flange opening" which reduces the service life of the rotor discs of a turbomachine turbine. In FIG. 2, the horizontal arrows represent the phenomenon of opening of flanges 241 and 221 which accompanies creeping.

In this regard, document FR 2 533 620 discloses another assembly for the turbine of a turbomachine comprising a part forming a movable sealing ring.

Referring to FIG. 3, the movable ring 28 comprises a hook 280 cooperating with a hook 240 of a downstream shroud 24 of an upstream disc 20a. This cooperation prevents thermal expansion of the sealing ring towards the airflow path 14. Furthermore, the radial alignment of the sealing wipers 32, the hooks 280, 240 and the bolted connection 26 allows more efficient cooling of the wipers 32. Indeed, the bolted connection 26 and the hooks 280, 240 bathe in cavities 40, 42, 44 where circulates air which is cooler than in the flow path 14. Finally, the cooperation of the hooks 240, 280 taking place by friction, the vibrations generated by the rotation of the discs 20a, 20b can cause leaks at the junction of the hooks.

Indeed, the thermal expansion of the movable ring 28, even when reduced, risks causing the opening of the fastening flange 241 of downstream shroud 24 of an upstream disc 20a, which carries the hook 240 and the cooperation of the hooks 280, 240 does not prevent the movable ring 28 from rotating relative to the rotor discs 20a, 20b. However, in operation, the dynamic stresses in the turbine 10 can cause such a rotation, which generates wear of the various elements of the assembly, and reduces the service life of the turbomachine.

There is therefore a need for an assembly for a turbine of a turbomachine comprising a movable sealing ring, and not having the disadvantages of the prior art.

DESCRIPTION OF THE INVENTION

One of the purposes of the invention is to increase the service life of turbomachine turbines by limiting the phenomenon of flange opening at the junction between successive rotor discs.

Another purpose of the invention is to allow better mechanical strength of the junction flanges of the successive rotor discs of a turbomachine turbine subjected to high thermal stresses.

Another purpose of the invention is to ensure the cooling of the junction cells between the rotor discs and the turbine vanes.

Another purpose of the invention is to ensure the sealing between the upstream and downstream cavities of the turbine.

Another purpose of the invention is to simplify the maintenance of the turbomachine turbines.

Another purpose of the invention is to ensure the anti-rotation of the sealing ring relative to the rotor discs, in operation.

In this regard, the invention relates to an assembly for a turbine of a turbomachine comprising:
- a first turbine rotor disc centered on a longitudinal axis of the turbomachine,
- a second turbine rotor disc centered on the longitudinal axis of the turbomachine, and fastened to the first rotor disc by bolting,
- a part forming a movable ring, said part carrying radial sealing wipers, characterized in that it comprises a system for anti-rotation of the movable ring relative to the rotor discs, said system comprising:
- a rotor disc fastening flange having a plurality of teeth distributed circumferentially around the longitudinal axis of the turbomachine, and
- movable ring fastening flange having a plurality of lugs distributed circumferentially around the longitudinal axis of the turbomachine, the engagement of the rotor disc fastening flange with the movable ring fastening flange ensuring, via the teeth and the lugs, the anti-rotation of the movable ring relative to the rotor discs.

In such an assembly, the movable ring is detached from the bolted connection so as to no longer be exposed to the temperature gradient. The disc flanges are subjected to greatly reduced stresses and their service life is significantly increased. Furthermore, the anti-rotation system prevents the movable ring from rotating relative to the discs in operation. In addition, the engagement of the teeth and the lugs ensures that, in the event of thermal expansion of the movable ring, or of centrifugal forces, the stresses exerted on the bolted connection remain limited. Finally, the assembly allows preserving the initial functions of the movable ring, that is to say the sealing and the participation in the ventilation of the cells of the rotor discs.

Advantageously, but optionally, the assembly according to the invention may further comprise at least one of the following characteristics, taken alone or in combination:
- each lug is separated from an adjacent lug by a groove, the engagement of the rotor disc fastening flange with the movable ring fastening flange being ensured by the cooperation of the plurality of radial teeth with the plurality of grooves,
- at least one of the rotor discs comprises lunulae formed at the fastener between the rotor discs, each lunula opening onto a groove in the movable ring fastening flange,
- it comprises a seal configured to isolate the cavity formed between the movable ring and the first rotor disc on the one hand, and the cavity formed between the movable ring and the second rotor disc on the other hand,
- the rotor disc fastening flange is formed on the first rotor disc, and
- the rotor disc fastening flange is formed on the second rotor disc.

The invention also relates to a turbomachine, comprising an assembly according to the preceding description.

The invention finally relates to a method for mounting an assembly as previously described, comprising the steps of:
- placing the anti-rotation system by engaging the teeth of the rotor disc fastening flange with the lugs of the movable ring fastening flange, and
- fastening the movable ring on a downstream shroud of the first upstream disc.

Advantageously, but optionally, the method according to the invention can further comprise at least one of the following characteristics, taken alone or in combination:
- a radial clearance provided for the mounting between the outer surface of the discs and the inner surface of the movable ring is removed by shrink-fitting the inner surface of the movable ring on the outer surface of the first rotor disc,
- an axial clearance is provided for the mounting between the movable ring fastening flange and the first rotor disc fastening flange, and
- an axial clearance is provided for the mounting between the movable ring fastening flange and the second rotor disc fastening flange.

DESCRIPTION OF THE FIGURES

Other characteristics, objects and advantages of the invention will emerge from the description which follows, which is purely illustrative and not limiting, and which should be read with reference to the appended drawings in which:

FIG. 9*b* illustrates the second step of an exemplary embodiment of a method for mounting an assembly for a turbine of a turbomachine according to the invention.

DETAILED DESCRIPTION OF THE INVENTION

With reference to the figures, an assembly 1 for a turbine 10 of a turbomachine will now be described.

In what follows, the upstream and downstream are defined relative to the direction of flow of the gases within the turbomachine.

Figure 2:
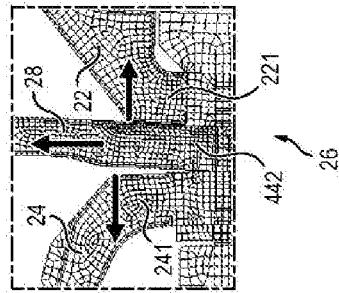
Figure 1:
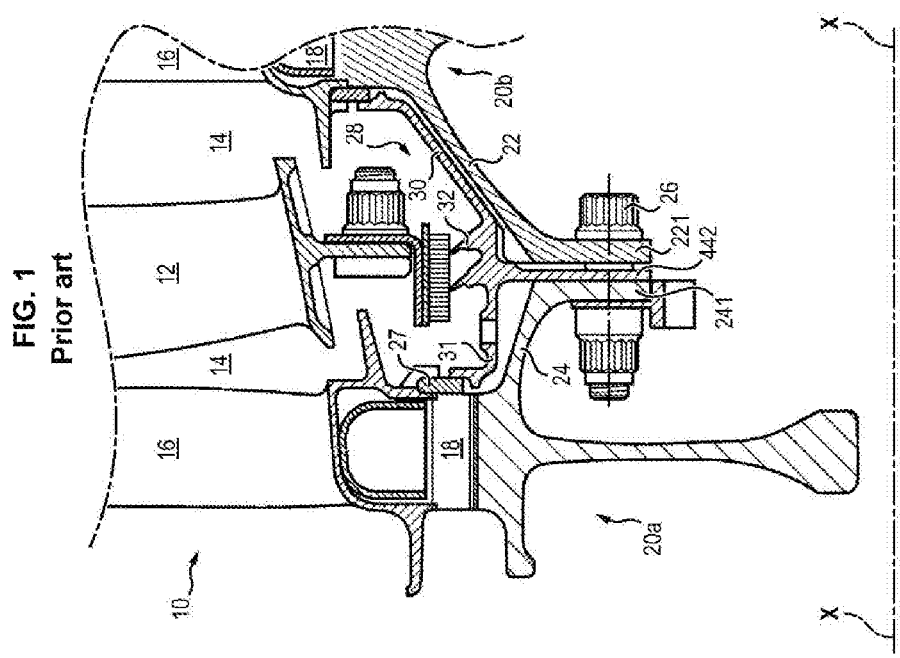
FIG. 1, already described, shows an assembly for a turbine of a turbomachine known from the state of the art, FIG. 2, also already described, illustrates a phenomenon of flange opening at a bolted connection of rotor discs of a turbine of a turbomachine, FIG. 3, also already described, shows another assembly for a turbine of a turbomachine known from the state of the art.
Figure 3:
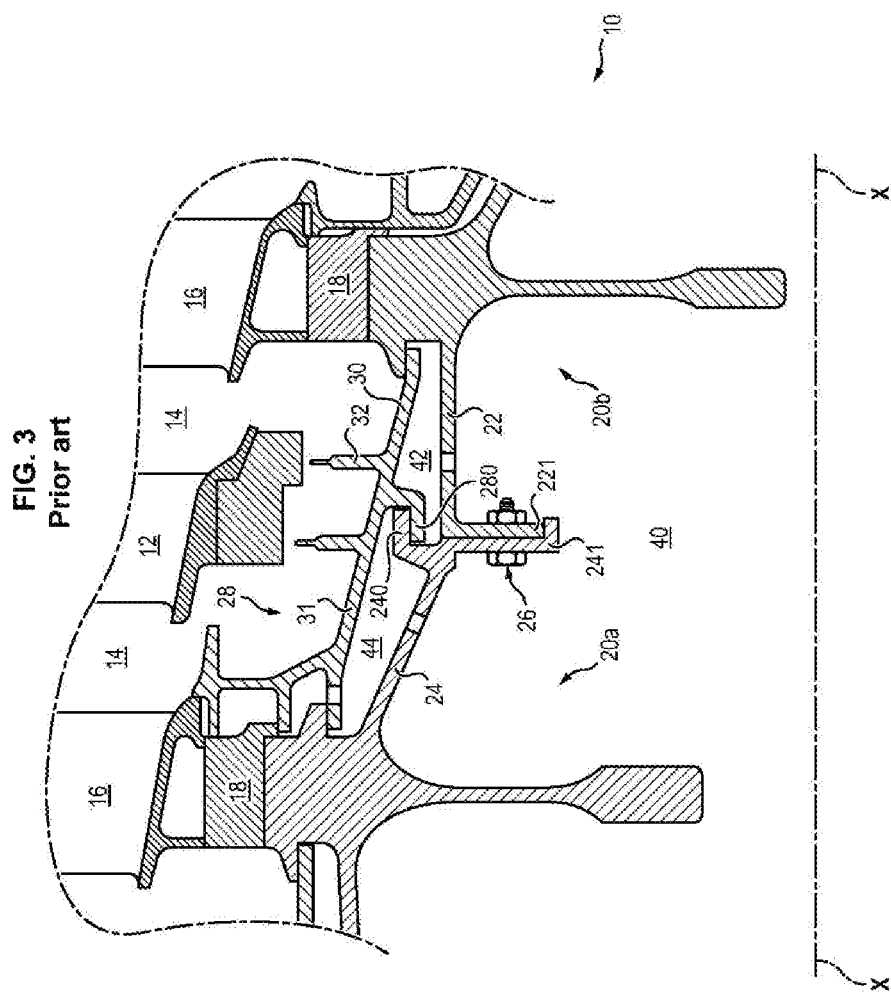
Figure 4:
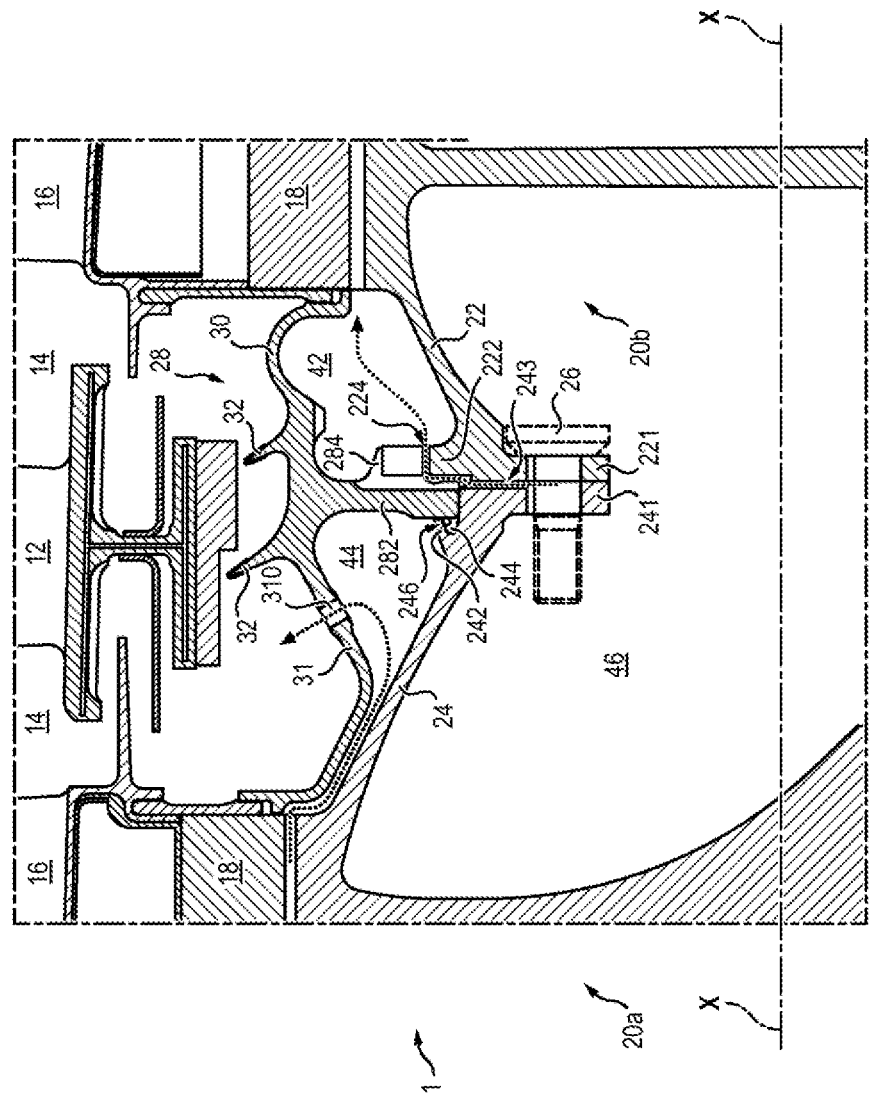
FIG. 4 is a schematic sectional view of a first exemplary embodiment of an assembly for a turbine of a turbomachine according to the invention.

With reference to FIG. 4, such an assembly 1 comprises:
- a first rotor disc 20*a* of a turbine 10 centered on a longitudinal axis X-X of the turbomachine,
- a second rotor disc 20*b* of a turbine 10 centered on the longitudinal axis X-X of the turbomachine, and fastened on the first rotor disc 20*a* by bolting 26, a part forming a movable ring 28, said part 28 carrying radial sealing wipers 32, Furthermore, such an assembly 1 comprises an anti-rotation system of the movable ring 28 relative to the rotor discs 20a, 20b, said system comprising:

a rotor disc fastening flange 222 having a plurality of teeth 224 distributed circumferentially around the longitudinal axis X-X of the turbomachine, and a movable ring fastening flange 282 having a plurality of lugs 284 distributed circumferentially around the longitudinal axis X-X of the turbomachine, the engagement of the rotor disc fastening flange 222 with the movable ring fastening flange 224 ensuring, via the teeth 224 and the lugs 284, the anti-rotation of the movable ring 28 relative to the rotor discs 20a, 20b.

Furthermore, as visible in FIG. 4, the turbine 10 comprises a distributor formed of a plurality of fixed vanes 12 disposed in a flow path 14, and of a movable wheel placed downstream of the distributor and formed of a plurality of movable vanes 16 also disposed in the flow path 14 and mounted by their root in cells 18 of the rotor discs 20a, 20b.

The rotor discs of the turbine 20a, 20b are assembled together by means of upstream 22 and downstream 24 shrouds which are fastened together by a bolted connection 26 passing through fastening flanges 221 and 241. This assembly of discs 20a, 20b is in turn connected to a turbine shaft (not shown) in order to be driven in rotation.

The movable ring 28 comprises a downstream holding flange 30 bearing against the second disc 20b, and an upstream holding flange 31 bearing against the first disc 20a.

As also visible in FIG. 4, in one embodiment, the teeth 224 are radial and the lugs 284 are axial, relative to the longitudinal axis X-X, so that their cooperation ensures the anti-rotation of the movable ring 28 relative to the rotor discs 20a, 20b. Alternatively, the teeth 224 can be axial and the lugs 284 can be radial, always relative to the longitudinal axis X-X. In this alternative embodiment (not shown), the axial teeth 224 can protrude at the upstream surface of the rotor disc fastening flange 222, while the radial lugs 284 can protrude at the inner surface of the movable ring 28 fastening flange 282.

Subsequently, an assembly 1 will be more precisely described with reference to the embodiment illustrated in FIG. 4. However, this is not limiting, since the characteristics described below can also be applied to an assembly 1 comprising axial teeth 224 and radial lugs 284.

Anti-Rotation System

Figure 5:
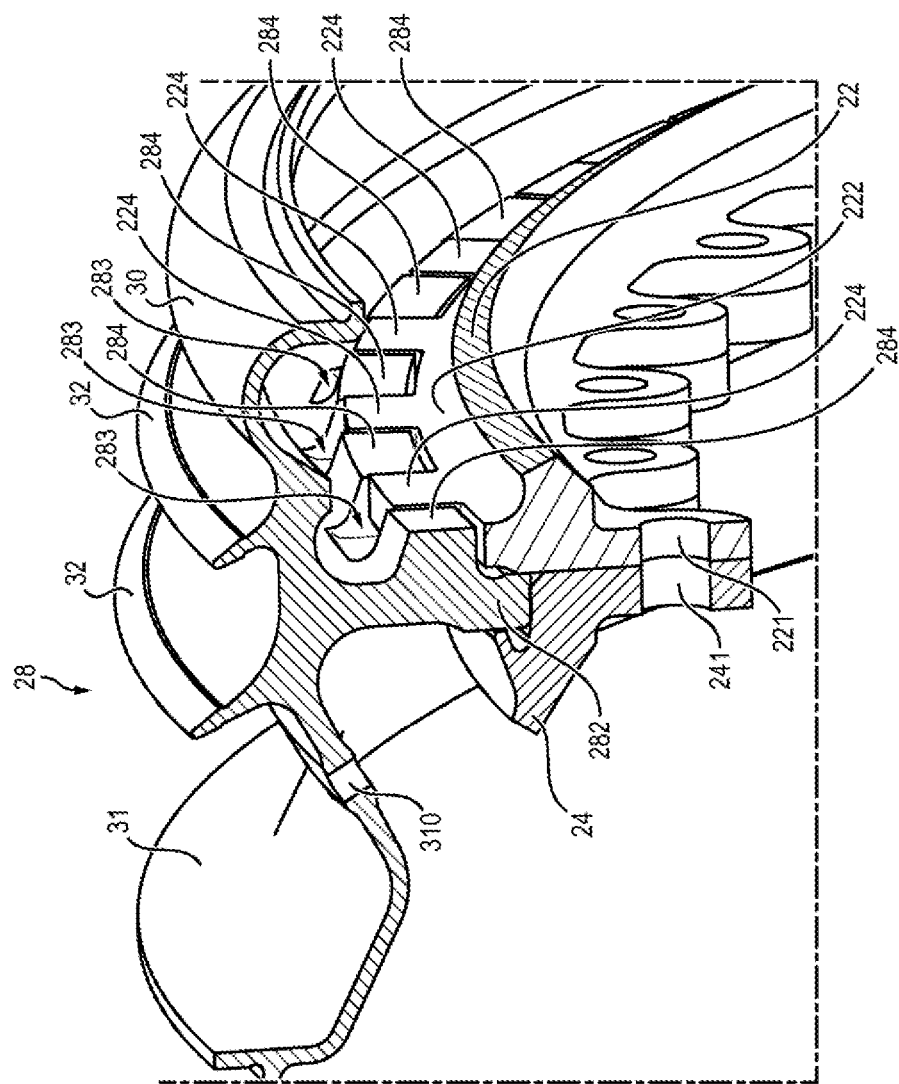
FIG. 5 is an enlarged perspective view of elements of the exemplary embodiment of an assembly for a turbine of a turbomachine illustrated in FIG. 4.

With reference to FIG. 5, the anti-rotation system will now be described in more detail.

As visible in FIG. 5, each lug 284 is separated from an adjacent lug 284 by a groove 283, also formed in the movable ring fastening flange 282. Thus, the movable ring fastening flange 282 has a plurality of grooves 283 distributed circumferentially around the longitudinal axis X-X of the turbomachine, the plurality of grooves being positioned alternately with the plurality of lugs 284. Preferably, the lugs 284 and the grooves 283 are equally distributed circumferentially around the axis X-X of the turbomachine.

As also visible in FIG. 5, the engagement of the rotor disc fastening flange 222 with the movable ring fastening flange 282 is ensured by the cooperation of the plurality of teeth 224 with the plurality of grooves 283. Preferably, the rotor disc fastening flange 222 has the same number of teeth 224 as the number of grooves 283 provided by the movable ring fastening flange 282. Furthermore, the lugs 284 cooperate with the spaces formed between the teeth 224.

The number, shape and dimensions of the lugs 284, grooves 283 and teeth 224 can be adjusted according to different embodiments which will not be described in more detail here. This adjustment may in particular depend on the mechanical and thermal stresses to which the assembly 1 is subjected in operation.

In any event, in operation, the relative tangential movements of the movable ring 28 relative to the discs 20a, 20b are reduced. Furthermore, the anti-rotation system of the assembly 1 allows thermal expansions of the movable ring 28 while limiting the forces exerted on the fastening flanges 221, 241. Finally, the anti-rotation system significantly lightens the mass of the assembly by removing the flange for fastening the movable ring 28 to the bolted connection 26, while being simple to implement during mounting and dismounting, for example during maintenance, as will be described later.

Ventilation System

Returning to FIG. 4, the assembly 1 comprises a ventilation system, which circulates fresh air upstream and downstream of the movable ring 28, in the cells 18 of the discs 20a, 20b.

Such a system takes fresh air from another point in the turbomachine, typically at the low pressure compressor (not shown). As also visible in FIGS. 6, 7 and 8, the air is then conveyed into a rotor cavity 46, then circulating through the bolted connection 36 into the cavity 42 formed between the movable ring 28 and the second rotor disc 20b. From there, the fresh air circulates in the cells 18, to at last supply the cavity formed between a second movable ring (not shown) and the second rotor disc 20b, then be evacuated towards the flow path via a drainage hole formed in the second movable ring. As can be seen in FIGS. 4 and 8, the cavity 44 formed between the movable ring 28 and the first rotor disc 20a also receives air coming from the cells 18 of the first rotor disc 20a, the air then being evacuated by the drainage hole 310 formed in the upstream holding flange 31 of the movable ring 28.

The circulation of fresh air through the bolted connection is implemented by means of lunulae 243 formed at the fastener between the rotor discs 20a, 20b, as in particular visible in FIG. 4. Advantageously, each lunula 243 is formed in at least one of the first and second rotor discs 20a, 20b and opens onto a groove 283 of the movable ring fastening flange 222, in order to allow the air to be evacuated towards the cavity 42 formed between the movable ring 28 and the second rotor disc 20b.

In addition to the cells 28, such a ventilation system advantageously allows reducing the thermal gradients within the bolted connection 36 and the movable ring 28.

Sealing

Still with reference to FIG. 4, the assembly 1 may also comprise a seal 246 configured to isolate the cavity 44 formed between the movable ring 28 and the first rotor disc 20a on the one hand, and the cavity 42 formed between the movable ring 28 and the second rotor disc 20b on the other hand.

Such a seal 246 can be in a toroidal shape and extend circumferentially around the longitudinal axis X-X of the turbomachine, for example within an annular cavity 244 formed for this purpose in the downstream shroud 24. The annular cavity 244 has an opening which faces the movable ring fastening flange 282, which is formed by an annular extension 242 protruding from the upstream shroud 24.

Figure 6:
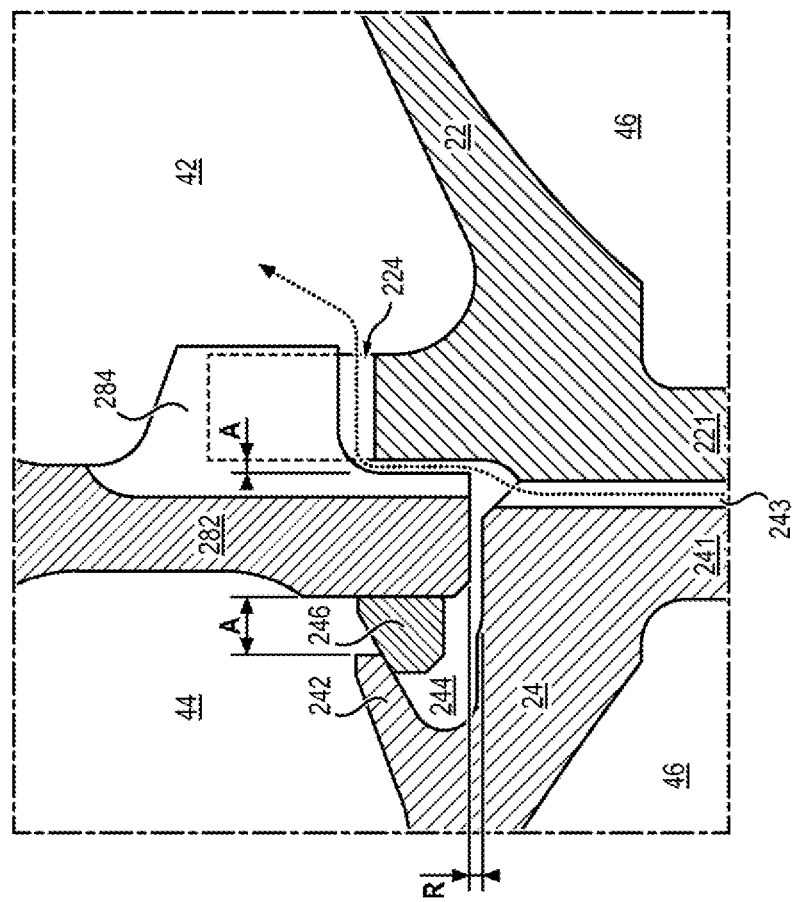
FIG. 6 is an enlarged schematic sectional view of a second exemplary embodiment of an assembly for a turbine of a turbomachine according to the invention.
Figure 7:
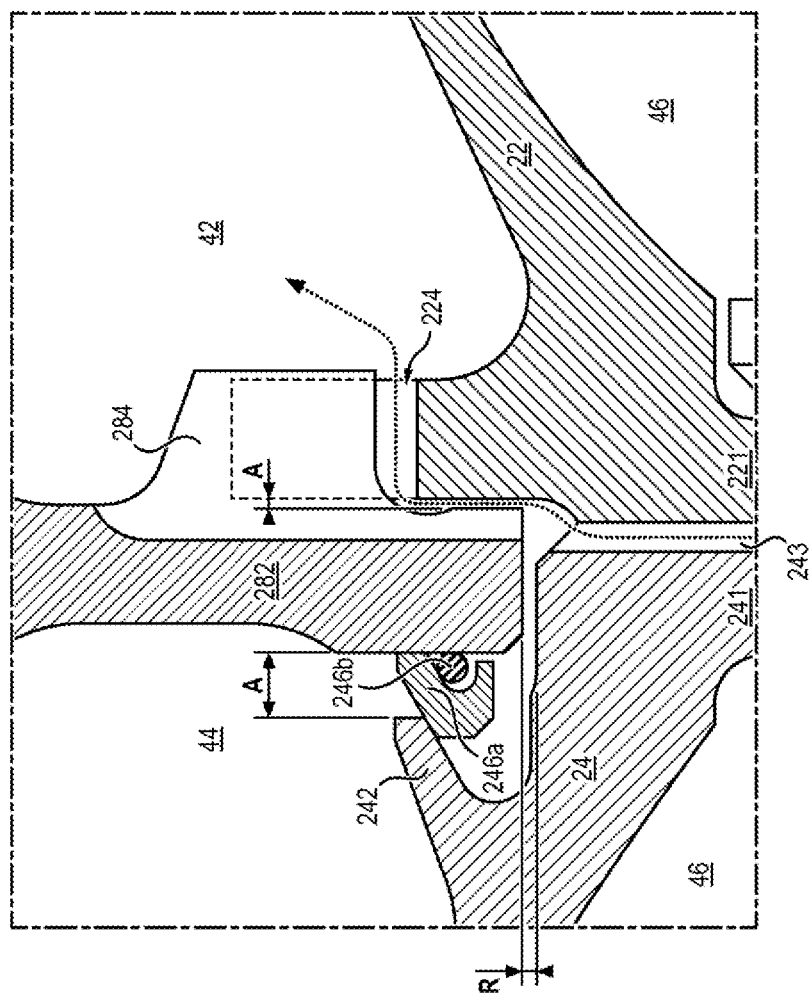
FIG. 7 is an enlarged schematic sectional view of a third exemplary embodiment of an assembly for a turbine of a turbomachine according to the invention.
Figure 8:
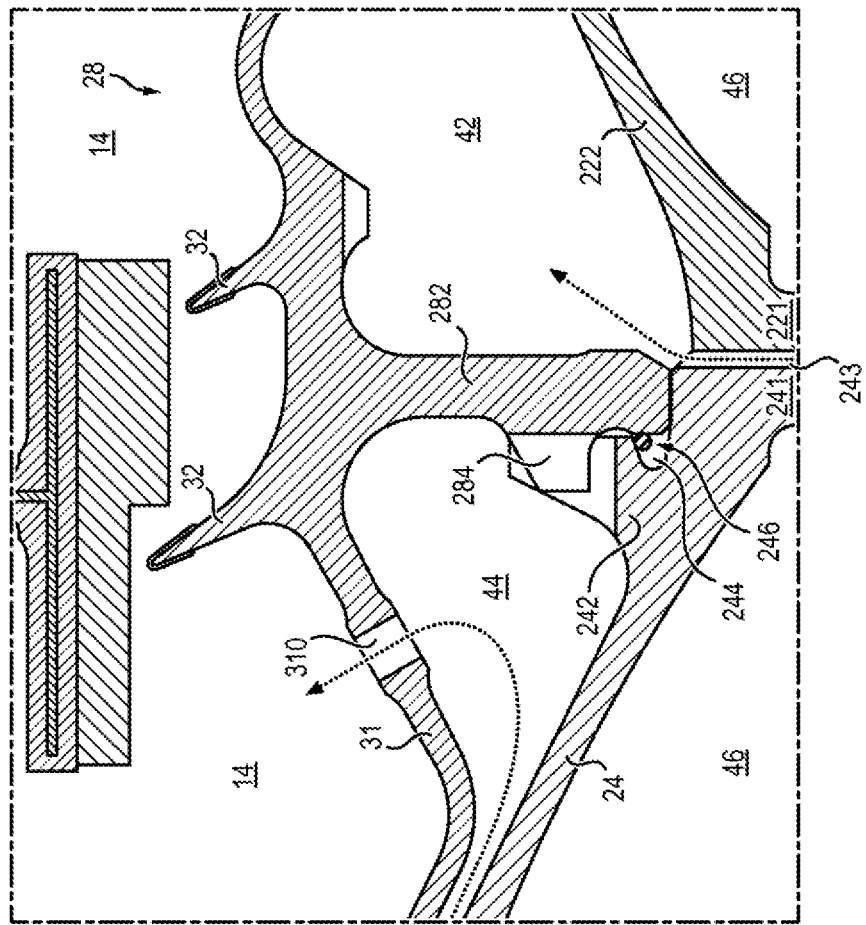
FIG. 8 is an enlarged schematic sectional view of a fourth exemplary embodiment of an assembly for a turbine of a turbomachine according to the invention.

Different embodiments of the seal 246 have been illustrated in FIGS. 6, 7 and 8. In these figures, it can be seen that there is an axial clearance A between the upstream surface of the movable ring fastening flange 282 and the downstream surface of the annular extension 242. It may indeed happen that, when mounting the assembly 1, the balancing of the assembly 1 requires providing such clearance in order to ensure the dynamic stability of the assembly 1 in operation. However, such clearances can be damaging for the sealing functions of the assembly 1. For this purpose, as shown in FIGS. 6, 7, and 8, it is possible to size the seal 246 so as to fill the axial clearance A. In FIG. 6, the cut strand-like annular shape, of a single part, of the seal 246 is such that the contact surfaces of said seal 246 are coincident with the upstream surface of the movable ring fastening flange 282 on the one hand, and the downstream surface of the annular extension 242 on the other hand. Such a configuration is implemented to fill an axial clearance A of large dimension relative to the size of the annular cavity 244. In FIG. 8, the seal 246 has an annular O-ring shape which is particularly useful when the dimension of the axial clearance A is small compared to the size of the annular cavity 244. Indeed, its shape allows adapting, for example by crushing, to the surfaces 242, 282 to be covered. Finally, in FIG. 7, a hybrid embodiment of the seal 246 can be distinguished, comprising a cut strand 246a whose dimensions allow variations in axial clearance A to be accommodated, and an annular O-ring 246b guaranteeing the sealing of the junction between the movable ring fastening flange 282 and the protruding extension 242.

Rotor Disc Fastening Flange

In FIGS. 4 to 7, the rotor disc fastening flange 222 is formed on the second rotor disc 20b, at an outer surface of the upstream shroud 22 of the downstream disc 20b, so that the anti-rotation system is located downstream of the movable ring 28.

In such an embodiment of the assembly 1, the mounting of the movable ring 28 on the downstream shroud 24 of the upstream disc 20a is carried out independently of the step of engaging the teeth 224 and the lugs 284. Indeed, the mounting step is implemented in order to facilitate the balancing and the tightening so that they cancel each other in operation, while, during the engagement step, it is necessary to angularly orient the movable ring 28 in order to align the teeth 224 and the lugs 284. This may require a specific tooling and/or an angular location on each part.

In order to avoid any ambiguity, in an alternative embodiment illustrated in FIG. 8, the rotor disc fastening flange is formed on the first rotor disc 20a, at an outer surface of the downstream shroud 24, while being for example combined with the protruding annular extension 242. Thanks to this configuration, the balancing, tightening and alignment steps can be implemented simultaneously, so as to optimize the operation of the assembly 1. Furthermore, such a configuration reduces the construction and/or maintenance time of the assembly 1.

Mechanical Strength and Increased Service Life

The assembly 1 therefore allows increasing the service life of the turbine 10 of the turbomachine by reducing the phenomenon of flange 221, 241 opening at the bolted connections 36 which connect the various rotor discs 20a, 20b of the turbine 10.

Indeed, when the gases are flowing in the turbine 10, the movable ring 28 will heat up. To the extent that there is no longer any mechanical continuity between the movable ring 28 and the bolted connection 26, only the movable ring 28 will expand, and therefore will not cause significant stress on the other flanges 221 and 241 of the bolted connection 26.

Consequently, the mechanical strength of the bolted connections 26 of the turbomachine turbines 10 comprising an assembly of the type of assembly 1 which has just been described is improved. Furthermore, the bolted connection 26 is lightened, which allows better maintaining the tightening torque. This results in an increase in their service life.

Mounting Method

Figure 9A:
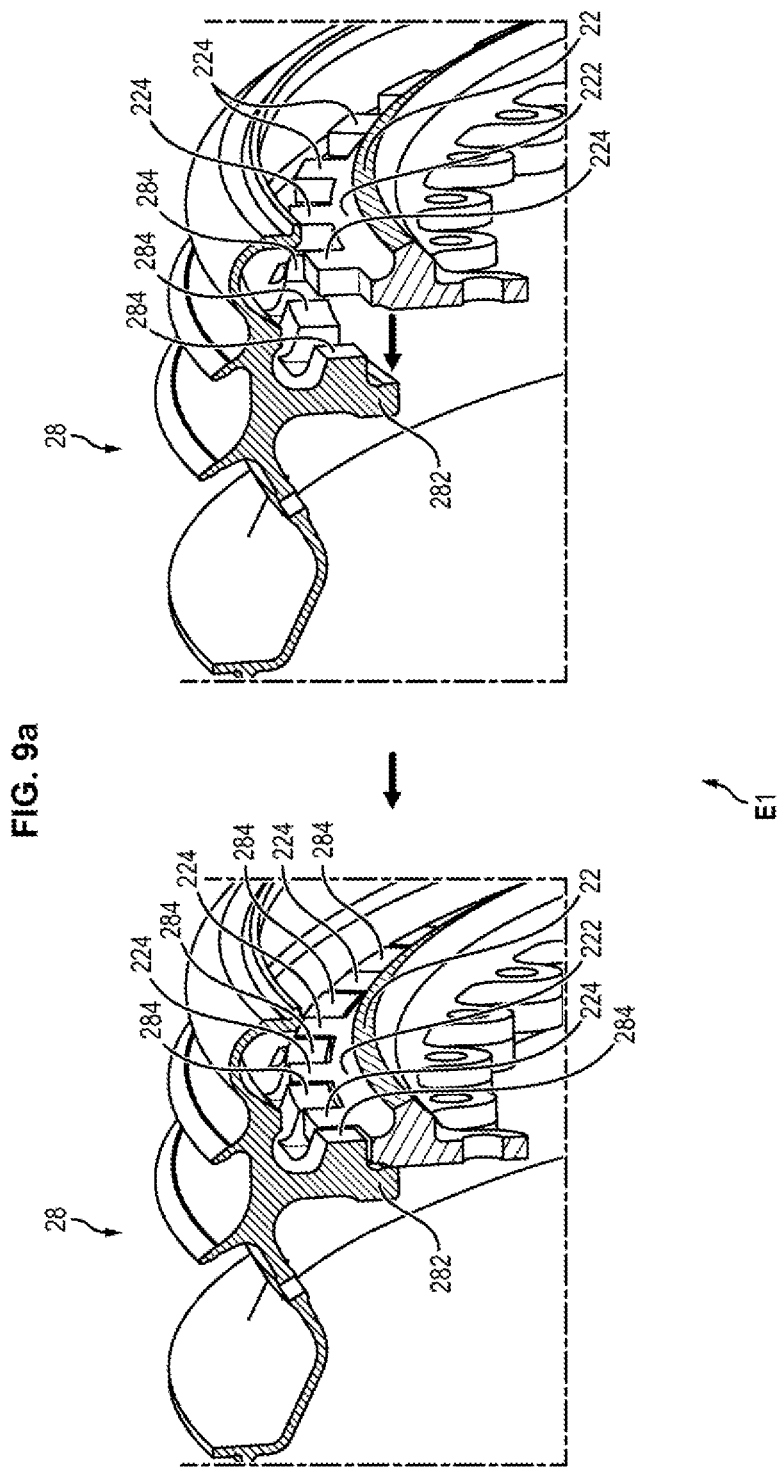
FIG. 9*a* illustrates the first step of an exemplary embodiment of a method for mounting an assembly for a turbine of a turbomachine according to the invention.

With reference to FIGS. 9a and 9b, a method for mounting E an assembly 1 as previously described, will now be described.

Such a mounting method E comprises the steps of:
placing E1 the anti-rotation system by engaging the teeth 224 of the rotor disc fastening flange 222 with the lugs 284 of the movable ring fastening flange 282, and
fastening E2 the movable ring 28 on a downstream shroud 24 of the first upstream disc 20a, Preferably, the fastening E2 of the movable ring 28 is carried out in a radially tight manner, so as to limit the unbalance or even cancel it by an offset between the rotor discs 20a, 20b on the one hand, and the movable ring 28 on the other hand, in the event of a sliding adjustment implementing axial A and radial R clearances.

Indeed, preferably, in order to ensure the functions of the movable ring 28, it is necessary that the mass below the sealing wipers 32 is sufficient to counter the radial forces undergone by the movable ring 28 during operation. Therefore, if it is not possible to make the assembly 1 rigid during mounting and balancing, so that it then becomes disengaged in rotation under the centrifugal effect in operation, a radial clearance R is provided between the outer surface of the discs 20a, 20b and the inner surface of the movable ring 28, as visible in FIGS. 6 and 7.

Subsequently, the fastening E2 of the movable ring 28 can be implemented by shrink-fitting the movable ring 28 on the downstream shroud 24 of the upstream disc 20a. Such a shrink-fitting can then involve the thermal expansion of the movable ring 28. The radial clearance R is therefore removed by shrink-fitting of the inner surface of the movable ring 28 on the outer surface of the first rotor disc 20a. It should be noted that, after the appearance of the clearances, in operation, by thermal expansion of the various elements of the assembly 1, the leaks can be limited by the presence of the seal 246 described above.

In addition to the radial clearance R, and for the same reasons, it may also be necessary, during the mounting method, to provide an axial clearance A between the movable ring fastening flange 282 and the first rotor disc 20a fastening flange 242, in the embodiment illustrated in FIG. 8, or to provide an axial clearance A between the movable ring fastening flange 282 and the second rotor disc 20b fastening flange 222, in the embodiment illustrated in FIGS. 4 to 7. To the extent that the axial clearances A allow achieving effective tightening between the discs 10a, 20b, and the movable ring 28, the isostatism of the assembly 1 is improved. Furthermore, in an embodiment as illustrated in FIGS. 6 and 7, such an axial clearance A, downstream of the movable ring fastening flange 282, also allows simplifying the implementation of the ventilation system, since it is thus no longer necessary for each lunula 243 to open onto a groove 283 of the movable ring fastening flange 222, in order to allow the air to be evacuated towards the cavity 42 formed between the movable ring 28 and the second rotor disc 20*b*.

Thanks to such a mounting method E, the use of complex tooling is advantageously reduced.

The invention claimed is:

1. An assembly comprising:
    a first rotor disc centered on a longitudinal axis;
    a second rotor disc centered on the longitudinal axis and bolted to the first rotor disc;
    a movable ring carrying radial sealing wipers; and
    a system comprising:
        a rotor disc fastening flange having a plurality of teeth distributed circumferentially around the longitudinal axis; and
        a movable ring fastening flange having a plurality of lugs distributed circumferentially around the longitudinal axis, the movable ring fastening flange engaging the rotor disc fastening flange in order to prevent a rotation of the movable ring relatively to the first rotor disc and the second rotor disc,
        wherein either the teeth of the rotor disc fastening flange are radial and the lugs of the movable ring fastening flange are axial, the teeth of the rotor disc fastening flange protruding radially from an outer surface of the rotor disk fastening flange, or the teeth of the rotor disc fastening flange are axial and the lugs of the movable ring fastening flange are radial, the lugs of the movable ring fastening flange protruding radially from an inner surface of the movable ring fastening flange.

2. The assembly of claim 1, wherein the system comprises a plurality of grooves, each lug of the plurality of lugs being separated from an adjacent lug of the plurality of lugs by a groove of the plurality of grooves, the plurality of teeth cooperating with the plurality of grooves.

3. The assembly of claim 2, wherein one of the first rotor disc and the second rotor disc comprises lunulae formed at a fastener between the first rotor disc and the second rotor disc, each lunula of the lunulae opening onto a groove of the plurality of grooves.

4. The assembly claim 1, further comprising a seal configured to isolate a first cavity formed between the movable ring and the first rotor disc, and a second cavity formed between the movable ring and the second rotor disc.

5. The assembly of claim 1, wherein the rotor disc fastening flange is formed on the first rotor disc.

6. The assembly of claim 1, wherein the rotor disc fastening flange is formed on the second rotor disc.

7. A turbomachine comprising the assembly of claim 1.

8. An assembly according to claim 1, wherein the second rotor disc is fastened to the first rotor disc by a bolted connection, wherein the first rotor disc and the second rotor disc are in contact with each other at said bolted connection.

9. A method for mounting an assembly comprising:
    a first rotor disc centered on a longitudinal axis and comprising a downstream shroud;
    a second rotor disc centered on the longitudinal axis;
    a movable ring carrying radial sealing wipers; and
    a system comprising:
        a rotor disc fastening flange having a plurality of teeth distributed circumferentially around the longitudinal axis; and
        a movable ring fastening flange having a plurality of lugs distributed circumferentially around the longitudinal axis,
        wherein either the teeth of the rotor disc fastening flange are radial and the lugs of the movable ring fastening flange are axial, the teeth of the rotor disc fastening flange protruding radially from an outer surface of the rotor disk fastening flange, or the teeth of the rotor disc fastening flange are axial and the lugs of the movable ring fastening flange are radial, the lugs of the movable ring fastening flange protruding radially from an inner surface of the movable ring fastening flange;
    the method comprising:
    engaging the plurality of teeth with the plurality of lugs; and
    fastening the movable ring on the downstream shroud.

10. The method of claim 9, further comprising providing an axial clearance between the movable ring fastening flange and the rotor disc fastening flange.

* * * * *